United States Patent
Kinjo et al.

(10) Patent No.: US 10,767,015 B2
(45) Date of Patent: Sep. 8, 2020

(54) OPTICAL MATERIAL COMPOSITION AND OPTICAL MATERIAL

(71) Applicant: MITSUBISHI GAS CHEMICAL COMPANY, INC., Tokyo (JP)

(72) Inventors: Kota Kinjo, Tokyo (JP); Yoshiaki Yamamoto, Tokyo (JP); Hiroshi Horikoshi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 242 days.

(21) Appl. No.: 15/575,532

(22) PCT Filed: Jul. 5, 2016

(86) PCT No.: PCT/JP2016/069827
§ 371 (c)(1),
(2) Date: Nov. 20, 2017

(87) PCT Pub. No.: WO2017/006919
PCT Pub. Date: Jan. 12, 2017

(65) Prior Publication Data
US 2018/0127550 A1    May 10, 2018

(30) Foreign Application Priority Data
Jul. 9, 2015    (JP) .................... 2015-137624

(51) Int. Cl.
*C08G 75/08*    (2006.01)
*C09K 9/02*    (2006.01)
*G02B 1/04*    (2006.01)

(52) U.S. Cl.
CPC ............... *C08G 75/08* (2013.01); *C09K 9/02* (2013.01); *G02B 1/04* (2013.01); *C09K 2211/1007* (2013.01); *C09K 2211/1029* (2013.01); *C09K 2211/1033* (2013.01); *C09K 2211/1088* (2013.01)

(58) Field of Classification Search
CPC . C09K 9/02; G02B 1/041; G02B 5/23; G02C 7/102; B29D 11/00653; G03C 1/685; G03C 1/733; Y10S 430/163; Y10S 348/902
See application file for complete search history.

(56) References Cited

U.S. PATENT DOCUMENTS

| | | |
|---|---|---|
| 5,683,628 A | 11/1997 | Mizuno et al. |
| 5,807,975 A | 9/1998 | Amagai et al. |
| 7,999,989 B2 | 8/2011 | Asai et al. |
| 2001/0047043 A1 | 11/2001 | Okoroafor et al. |
| 2003/0022956 A1 | 1/2003 | Wanigatunga et al. |
| 2007/0270548 A1 | 11/2007 | Bojkova et al. |
| 2009/0316246 A1 | 12/2009 | Asai et al. |
| 2011/0124836 A1 | 5/2011 | Okoroafor et al. |
| 2015/0177416 A1 | 6/2015 | Ryu |
| 2016/0170107 A1 | 6/2016 | Ryu |
| 2016/0194429 A1 | 7/2016 | Ryu |
| 2016/0202391 A1 | 7/2016 | Shimoda et al. |

FOREIGN PATENT DOCUMENTS

| | | |
|---|---|---|
| CN | 101437873 A | 5/2009 |
| EP | 2 325 234 A2 | 5/2011 |
| JP | H08272036 A | 10/1996 |
| JP | H09110979 A | 4/1997 |
| JP | 2004078052 A | 3/2004 |
| JP | 2004525240 A | 8/2004 |
| JP | 2005023238 A | 1/2005 |

(Continued)

OTHER PUBLICATIONS

English translation of JP 2005-281527 A, obtained Sep. 15, 2019 from J-PlatPat (Jpan Platform for Patent Information) 17 pages . (Year: 2019).*

(Continued)

*Primary Examiner* — Cynthia Hamilton

(74) *Attorney, Agent, or Firm* — Greenblum & Bernstein, P.L.C.

(57) ABSTRACT

The present invention makes it possible to provide an optical material composition containing an episulfide compound (A), a polythiol compound (B), and a photochromic compound (C). The episulfide compound (A) is preferably a compound represented by formula (1), and the polythiol compound (B) is preferably a compound represented by formula (6).

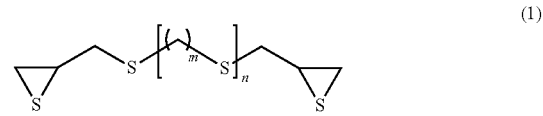

(1)

(In formula (1), m represents an integer of 0 to 4, and n represents an integer of 0 to 2.)

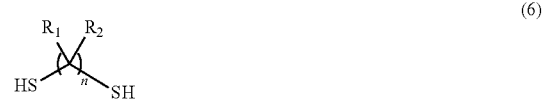

(6)

(In formula (6), n represents an integer of 4 to 20, and $R_1$ and $R_2$ may be the same or different and represent H, SH, $C_{1-10}$ alkyl groups, or $C_{1-10}$ alkylthiol groups.)

8 Claims, No Drawings

(56) References Cited

FOREIGN PATENT DOCUMENTS

| JP | 2005281527 A | 10/2005 |
|---|---|---|
| JP | 2008030439 A | 2/2008 |
| JP | 2009536255 A | 10/2009 |
| JP | 2012061665 A | 3/2012 |
| JP | 5716878 B1 | 5/2015 |
| WO | WO 01/70722 A2 | 9/2001 |
| WO | WO 2007/131145 A1 | 11/2007 |
| WO | 2010010713 A1 | 1/2010 |
| WO | 2014002844 A1 | 1/2014 |
| WO | 2015016363 A1 | 2/2015 |
| WO | 2015016364 A1 | 2/2015 |

OTHER PUBLICATIONS

ISR from PCT/JP2016/069827 dated Oct. 4, 2016.
IPRP from PCT/JP2016/069827 dated Jan. 9, 2018.
ESR for EP 16821388.2 dated Nov. 29, 2018.
Liu et al. (Eds), "Photonics Technology and Application", 1$^{st}$ Edition, Guangdong Science and Technology Press, Anhui Science and Technology Press, Part I, pp. 51-52 (2006) (w/ English-language translation).

\* cited by examiner

OPTICAL MATERIAL COMPOSITION AND OPTICAL MATERIAL

TECHNICAL FIELD

The present invention relates to a composition for optical materials, etc., and particularly relates to a composition for optical materials, etc. suitable for an optical material for a plastic lens, a prism, an optical fiber, an information recording substrate, a filter or the like, in particular for a plastic lens.

BACKGROUND ART

Plastic materials are lightweight, highly tough and easy to be dyed, and therefore are widely used recently for various types of optical materials, particularly eyeglass lenses. Optical materials, particularly eyeglass lenses, are specifically required to have, as physical properties, low specific gravity, high transparency and low yellowness, high heat resistance, high strength and the like, and as optical properties, high refractive index and high Abbe number.

A high refractive index allows a lens to be thinner, and a high Abbe number reduces the chromatic aberration of a lens. However, as the refractive index is increased, the Abbe number is decreased. Therefore, it has been studied to improve both of the refractive index and the Abbe number. Among methods which have been proposed, the most representative method is a method using an episulfide compound (see Patent Document 1).

Meanwhile, it has been also studied to add a high value to plastic lenses by imparting various functions thereto, and in particular, many lenses to which photochromic function is imparted have been proposed to be used for spectacles. As techniques of imparting photochromic function, a technique of coating a lens surface with a composition containing a photochromic compound (hereinafter referred to as "the coating technique", see Patent Documents 2 and 3) and a technique of molding a lens, wherein a photochromic compound is mixed with a composition for optical materials (hereinafter referred to as "the mixing technique", see Patent Documents 4 and 5) have been mainly proposed.

However, when using the coating technique, the manufacturing process is complicated, the yield may be reduced, and peeling may be caused during use, and regarding the mixing technique, since the photochromic compound reacts with a monomer of isocyanate or the like, the mixing technique has been successfully applied only to lens materials having a low refractive index.

Application of the mixing technique to materials having a high refractive index has been also proposed, but the highest value of the refractive index obtained was 1.60 (see Patent Documents 6-8).

PRIOR ART DOCUMENTS

Patent Documents

Patent Document 1: Japanese Laid-Open Patent Publication No. H09-110979
Patent Document 2: Japanese Laid-Open Patent Publication No. 2005-023238
Patent Document 3: Japanese Laid-Open Patent Publication No. 2008-030439
Patent Document 4: Japanese Laid-Open Patent Publication No. H08-272036
Patent Document 5: Japanese Laid-Open Patent Publication No. 2004-078052
Patent Document 6: International Publication WO2014/002844 pamphlet
Patent Document 7: international Publication WO2015/016363 pamphlet
Patent Document 8: International Publication WO2015/016364 pamphlet

SUMMARY OF THE INVENTION

Problems to be Solved by the Invention

The problem to be solved by the present invention is to provide an optical material having photochromic function and having a high refractive index without using a coating technique.

Means for Solving the Problems

The present inventors diligently made researches in order to solve the problem, and found that an optical material obtained by using a composition for optical materials containing an episulfide compound (A), a polythiol compound (B) and a photochromic compound (C) has a high refractive index and photochromic performance, and thus the present invention was achieved.

Specifically, the present invention is as follows:

<1> A composition for optical materials, which comprises an episulfide compound (A), a polythiol compound (B) and a photochromic compound (C).

<2> The composition for optical materials according to item <1>, wherein in the composition for optical materials, the ratio of the episulfide compound (A) is 65 to 99% by mass, the ratio of the polythiol compound (B) is 0.9 to 35% by mass and the ratio of the photochromic compound (C) is 0.001 to 10% by mass.

<3> The composition for optical materials according to item <1> or <2>, wherein the episulfide compound (A) is a compound represented by formula (1):

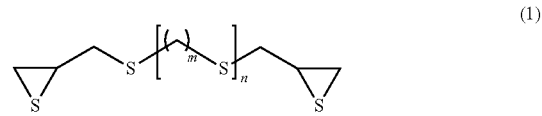

(1)

wherein: m represents an integer of 0 to 4; and n represents an integer of 0 to 2.

<4> The composition for optical materials according to any one of items <1> to <3>, wherein the polythiol compound (B) is a compound represented by formula (5):

HS—X—SH (5)

wherein: X represents an alkylene group having at least one selected from the group consisting of —S—, —O— and —CO— in the main chain, wherein the carbon number of the main chain is 4 to 20; and X may have SH, a $C_{1-10}$ alkyl group, a $C_{1-10}$ alkylthiol group or a $C_{1-10}$ mercaptoalkylcarbonyloxy group in the side chain.

<5> The composition for optical materials according to any one of items <1> to <3>, wherein the polythiol compound (B) is a compound represented by formula (6):

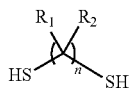

(6)

wherein: n represents an integer of 4 to 20; and $R_1$ and $R_2$ may be the same or different and represent H, SH, a $C_{1-10}$ alkyl group or a $C_{1-10}$ alkylthio group.

<6> The composition for optical materials according to item <5>, wherein the polythiol compound (B) is a compound represented by formula (7):

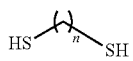

(7)

wherein n represents an integer of 4 to 20.

<7> The composition for optical materials according to item <6>, wherein n in formula (7) represents an integer of 5 to 20.

<8> The composition for optical materials according to any one of items <1> to <7>, wherein the photochromic compound (C) is selected from the group consisting of a spiropyran-based compound, a spirooxazine-based compound, a spiroperimidine-based compound, a benzopyran-based compound, a fulgide-based compound, a naphthopyran-based compound, a diarylethene-based compound and an azobenzene-based compound.

<9> An optical material obtained by polymerizing and curing the composition for optical materials according to any one of items <1> to <8>.

Advantageous Effect of the Invention

When using an optical material obtained by using the composition for optical materials of the present invention, it is possible to provide a high-performance optical material having sufficient photochromic function and a high refractive index without using a coating technique.

EMBODIMENTS FOR CARRYING OUT THE INVENTION

Hereinafter, the present invention will be described in detail.

The composition for optical materials of the present invention contains an episulfide compound (A), a polythiol compound (B) and a photochromic compound (C).

Hereinafter, the episulfide compound (A), the polythiol compound (B) and the photochromic compound (C) that are raw materials to be used in the present invention will be described.

The episulfide compound (A) to be used in the present invention includes all episulfide compounds.

Hereinafter, specific examples of the episulfide compound (A) are classified into a compound having a chain aliphatic skeleton, a compound having an aliphatic cyclic skeleton and a compound having an aromatic skeleton and listed below, but the episulfide compound (A) is not limited thereto.

Examples of the compound having a chain aliphatic skeleton include a compound represented by formula (1) below.

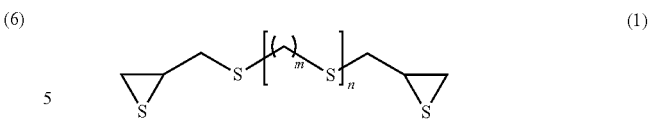

(1)

(In formula (1), m represents an integer of 0 to 4, and n represents an integer of 0 to 2.)

Specific examples thereof include bis(β-epithiopropyl)sulfide (n=0 in formula (1) above), bis(β-epithiopropyl)disulfide (m=0 and n=1 in formula (1) above), bis(β-epithiopropylthio)methane (m=1 and n=1 in formula (1) above), 1,2-bis(β-epithiopropylthio)ethane (m=2 and n=1 in formula (1) above), 1,3-bis(β-epithiopropylthio)propane (m=3 and n=1 in formula (1) above), 1,4-bis(β-epithiopropylthio)butane (m=4 and n=1 in formula (1) above) and bis(β-epithiopropylthioethyl)sulfide (m=2 and n=2 in formula (1) above).

Examples of the compound having an aliphatic cyclic skeleton include a compound represented by formula (2) or (3) below.

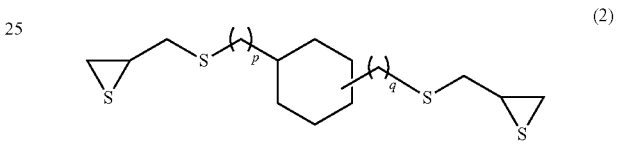

(2)

(p and q each independently represent an integer of 0 to 4.)

Specific examples of the compound represented by formula (2) include 1,3- and 1,4-bis(β-epithiopropylthio)cyclohexane (p=0 and q=0 in formula (2) above) and 1,3- and 1,4-bis(β-epithiopropylthiomethyl)cyclohexane (p=1 and q=1 in formula (2) above).

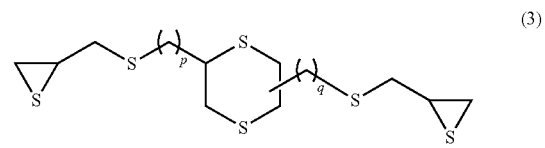

(3)

(p and q each independently represent an integer of 0 to 4.)

Specific examples of the compound represented by formula (3) include 2,5-bis(β-epithiopropylthio)-1,4-dithiane (p=0 and q=0 in formula (3) above) and 2,5-bis(β-epithiopropylthioethylthiomethyl)-1,4-dithiane (p=1 and q=1 in formula (3) above).

Examples of the compound having an aromatic skeleton include a compound represented by formula (4) below.

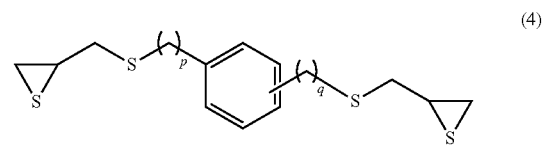

(4)

(p and q each independently represent an integer of 0 to 4.)

Specific examples thereof include 1,3- and 1,4-bis(β-epithiopropylthio)benzene (p=0 and q=0 in formula (4) above) and 1,3- and 1,4-bis(β-epithioproplythiomethyl)benzene (p=1 and q=1 in formula (4) above).

These substances may be used solely, or two or more of them may be used as a mixture.

In terms of availability, the compound having a chain aliphatic skeleton represented by formula (1) above is preferred, bis((3-epithiopropyl)sulfide (n=0 in formula (1) above) and bis(β-epithiopropyl)disulfide (m=0 and n=1 in formula (1) above) are particularly preferred, and bis(β-epithiopropyl)sulfide (n=0 in formula (1) above) is most preferred.

The method for obtaining the episulfide compound (A) is not particularly limited. A commercially-available product may be used as the episulfide compound (A). Alternatively, the episulfide compound (A) may be synthesized according to a publicly-known method.

For example, bis(β-epithiopropyl)sulfide (n=0 in formula (1) above) can be synthesized according to a publicly-known technique (Japanese Patent No. 3491660).

The ratio of the episulfide compound (A) in the composition for optical materials is usually 65 to 99% by mass, preferably 70 to 90% by mass, more preferably 75 to 85% by mass, and particularly preferably 75 to 80% by mass. This is because, when the ratio is within the above-described range, it is possible to obtain an optical material having a high refractive index.

As the polythiol compound (B) to be used in the present invention, a polythiol compound in which the carbon number of the main chain is 4 to 20 is preferred, and a polythiol compound represented by formula (5) below and a polythiol compound represented by formula (6) below are more preferred.

$$HS-X-SH \quad (5)$$

In formula (5), X represents an alkylene group having at least one selected from the group consisting of —S—, —O— and —CO— in the main chain, wherein the carbon number of the main chain is 4 to 20. X preferably has —S— in the main chain, and the carbon number of the main chain is more preferably 5 to 20, and particularly preferably 6 to 10. X may have SH, a $C_{1-10}$ alkyl group, a $C_{1-10}$ alkylthio group or a $C_{1-10}$ mercaptoalkylcarbonyloxy group in the side chain, but formula (5) preferably represents a linear polythiol not having a side chain because good photochromic performance is obtained thereby.

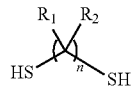

(6)

In formula (6), n represents an integer of 4 to 20, preferably an integer of 5 to 20, and particularly preferably an integer of 6 to 10. $R_1$ and $R_2$ may be the same or different and represent H, SH, a $C_{1-10}$ alkyl group or a $C_{1-10}$ alkylthio group, and preferably represent H.

Specific examples of the polythiol compound (B) are described below, but the polythiol compound (B) is not limited thereto.

Specific examples of the polythiol compound (B) include 1,4-dimercaptobutane, 1,5-dimercaptopentane, 1,6-dimercaptohexane, 1,7-dimercaptoheptane, 1,8-dimercaptooctane, 1,9-dimercaptononane, 1,10-dimercaptodecane, bis(2-mercaptoethyl)sulfide, 1,2-bis(2-mercaptoethylthio)ethane, 1,5-dimercapto-3-oxapentane, 1,8-dimercapto-3,6-dioxaoctane, 1,2-dimercapto-3,4-dimethoxybutane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, ethyleneglycolbis(2-mercaptoacetate), ethyleneglycolbis(3-mercaptopropionate), 1,4-butanediolbis(2-mercaptoacetate), 1,4-butanediolbis(3-mercaptopropionate), trimethylolpropanetris(2-mercaptoacetate), trimethylolpropanetris(3-mercaptopropionate), pentaerythritol tetrakis(2-mercaptoacetate), pentaerythritol tetrakis(3-mercaptopropionate), 1,1-dimercaptocyclohexane, 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(mercaptoethyl)-1,4-dithiane, 1,2-bis(mercaptomethyl)benzene, 1,3-bis(mercaptomethyl)benzene, 1,4-bis(mercaptomethyl)benzene, bis(4-mercaptophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether, 2,2-bis(4-mercaptomethylphenyl)propane, 3-thia-1,5-dimercaptopentane, 3,6-dioxa-1,8-dimercaptooctane and 3,7-dithia-1,9-dimercaptononane. These compounds may be used solely, or two or more of them may be used as a mixture.

Among them, a linear dithiol not having a side chain, specifically, a compound represented by formula (7) below is preferred because good photochromic performance is obtained thereby.

(7)

In formula (7), n represents an integer of 4 to 20, preferably an integer of 5 to 20, and particularly preferably an integer of 6 to 10.

Particularly preferred are 1,10-dimercaptodecane, 1,9-dimercaptononane, 1,8-dimercaptooctane, 1,7-dimercaptoheptane and 1,6-dimercaptohexane, which are dithiols, wherein the carbon number of the main chain is 6 to 20.

The method for obtaining the polythiol compound (B) is not particularly limited. A commercially-available product may be used as the polythiol compound (B). Alternatively, the polythiol compound (B) may be synthesized according to a publicly-known method. For example, 1,10-dimercaptodecane, 1,8-dimercaptooctane and 1,6-dimercaptohexane can be easily obtained as reagent products.

The ratio of the polythiol compound (B) in the composition for optical materials is usually 0.9 to 35% by mass, preferably 5 to 30% by mass, and particularly preferably 10 to 25% by mass.

This is because, when the amount of the polythiol compound to be added is small, sufficient photochromic performance cannot be obtained, and when the amount is too large, the reactivity with the episulfide compound is reduced.

The photochromic compound (C) to be used in the present invention is a compound exhibiting a characteristic, wherein optical transparency is changed by absorption of ultraviolet light or visible light and recovered when a light source is blocked.

The photochromic compound (C) is not particularly limited as long as it is a compound having this characteristic, and can be arbitrarily selected and used.

Examples thereof include a spiropyran-based compound, a spirooxazine-based compound, a spiroperimidine-based compound, a benzopyran-based compound, a fulgide-based compound, a naphthopyran-based compound, a diarylethene-based compound and an azobenzene-based compound. These compounds may be used solely, or two or more of them may be used as a mixture.

Specific examples of the spiropyran-based compound include
1-(2-hydroxyethyl)-3,3-dimethylindolino-6'-nitrobenzopyrylospiran,
1,3,3-trimethylindolinobenzopyrylospiran,
1,3,3-trimethylindolino-6'-nitrobenzopyrylospiran,
1,3,3-trimethylindolino-6'-bromobenzopyrylospiran,
1,3,3-trimethylindolino-8'-methoxybenzopyrylospiran and
1,3,3-trimethylindolino-β-naphthopyrylospiran.

Specific examples of the spirooxazine-based compound include 1,3,3-trimethylindolinonaphthospirooxazine.

Specific examples of the spiroperimidine-based compound include 2,3-dihydro-2-spiro-4'[8'-aminonaphthalen-1' (4'H)-one]perimidine and 2,3-dihydro-2-spiro-7'[8'-imino-7',8'-dihydronaphthalen-1'-amine]perimidine.

Specific examples of the benzopyran-based compound include 4-[3-phenyl-3-(4-piperidin-1-yl-phenyl)-3H-benzo[f]chromen-6-yl]morpholine.

Specific examples of the fulgide-based compound include
N-cyanomethyl-6,7-dihydro-4-methyl-2-phenylspiro(5,6-benzo[b]thiophenedicarboxyi mide-7,2'-tricyclo[3.3.1.1$^{3,7}$]decane),
N-cyanomethyl-6,7-dihydro-2-(p-methoxyphenyl)-4-methylspiro(5,6-benzo[b]thiophen edicarboxyimide-7,2'-tricyclo[3.3.1.1$^{3,7}$]decane),
6,7-dihydro-N-methoxycarbonylmethyl-4-methyl-2-phenylspiro(5,6-benzo[b]thiophene dicarboxyimide-7,2'-tricyclo[3.3.1.1$^{3,7}$]decane),
6,7-dihydro-4-methyl-2-(p-methylphenyl)-N-nitromethylspiro(5,6-benzo[b]thiophenedicarboxyimide-7,2'-tricyclo[3.3.1.1$^{3,7}$]decane),
N-cyanomethyl-6,7-dihydro-4-cyclopropyl-3-methylspiro(5,6-benzo[b]thiophenedicarboxyimide-7,2'-tricyclo[3.3.1.1$^{3,7}$]decane),
N-cyanomethyl-6,7-dihydro-4-cyclopropylspiro(5,6-benzo[b]thiophenedicarboxyimide-7,2'-tricyclo[3.3.1.1$^{3,7}$]decane) and
N-cyanomethyl-6,7-dihydro-2-(p-methoxyphenyl)-4-cyclopropylspiro(5,6-benzo[b]thiophenedicarboxyimide-7,2'-tricyclo[3.3.1.1$^{3,7}$]decane).

Specific examples of the naphthopyran-based compound include
3,3-diphenyl-3H-naphtho[2,1-b]pyran, spiro[norbornane-2,2'-2H-benzo[h]chromene],
spiro[bicyclo[3.3.1]nonane-9,2'-2H-benzo[h]chromene],
T-methoxyspiro[bicyclo[3.3.1]nonane-9,2'-2H-benzo[h]chromene],
7'-methoxyspiro[norbornane-2,2'-2H-benzo[f]chromene],
2,2-dimethyl-7-octoxy-2H-benzo[h]chromene,
spiro[2-bicyclo[3.3.1]nonene-9,2?-2H-benzo[h]chromene],
spiro[2-bicyclo[3.3.1]nonene-9,2'-2H-benzo[f]chromene],
6-morpholino-3,3-bis(3-fluoro-4-methoxyphenyl)-3H-benzo[f]chromene and
5-isopropyl-2,2-diphenyl-2H-benzo[h]chromene.

Specific examples of the diarylethene-based compound include
2,3-bis(2,4,5-trimethyl-3-thienyl)maleic anhydride,
2,3-bis(2,4,5-trimethyl-3-thienyl)maleimide,
cis-1,2-dicyano-1,2-bis(2,4,5-trimethyl-3-thienyl)ethene,
1,2-bis[2-methylbenzo[b]thiophen-3-yl]-3,3,4,4,5,5-hexafluoro-1-cyclopentene and
1,2-bis(2,4-dimethyl-5-phenyl-3-thienyl)-3,3,4,4,5,5-hexafluoro-1-cyclopentene.

Specific examples of the azobenzene-based compound include azobenzene.

Among the above-described compounds, the spiropyran-based compound, the benzopyran-based compound, the fulgide-based compound and the diarylethene-based compound are preferred.

The method for obtaining the photochromic compound (C) is not particularly limited. A commercially-available product may be used as the photochromic compound (C). Alternatively, the photochromic compound (C) may be synthesized according to a publicly-known method.

The ratio of the photochromic compound (C) in the composition for optical materials is usually 0.001 to 10% by mass, preferably 0.01 to 1% by mass, and particularly preferably 0.01 to 0.5% by mass.

This is because, when the ratio is less than 0.001% by mass, photochromic performance cannot be sufficiently exerted, and when the ratio is more than 10% by mass, an optical material tends to be cured insufficiently and light transmittance tends to be significantly reduced.

Note that sulfur can be added to the composition for optical materials of the present invention. When using sulfur, it is preferred to preliminarily react sulfur with the episulfide compound (A) in advance.

Conditions for this preliminary polymerization reaction are preferably −10° C. to 120° C. and 0.1 to 240 hours, more preferably 0 to 100° C. and 0.1 to 120 hours, and particularly preferably 20 to 80° C. and 0.1 to 60 hours.

For promoting the preliminary reaction, a catalyst for preliminary reaction can be used and it is effective.

Examples of the catalyst for preliminary reaction include 2-mercapto-1-methylimidazole, triphenylphosphine, 3,5-dimethylpyrazole, N-cyclohexyl-2-benzothiazolylsulfinamide, dipentamethylene thiuramtetrasulfide, tetrabutyl thiuram disulfide, tetraethyl thiuram disulfide, 1,2,3-triphenylguanidine, 1,3-diphenyl guanidine, 1,1,3,3-tetramethyleneguanidine, aminoguanidineurea, trimethylthiourea, tetraethylthiourea, dimethylethylthiourea, zinc dibutyldithiocarbamate, zinc dibenzyldithiocarbamate, zinc diethyldithiocarbamate, zinc dimethyldithiocarbamate and pipecorium pipecolyldithiocarbamate.

For suppressing precipitation of solid sulfur, it is preferred that 10% or more of the sulfur is consumed by this preliminary polymerization reaction (when the amount of the sulfur before the reaction is regarded as 100%), and it is more preferred that 20% or more of the sulfur is consumed thereby.

The preliminary reaction may be performed in any atmosphere, for example, under inert gas such as air, nitrogen or the like, in a sealed state under normal pressure or raised or reduced pressure, or the like. In order to detect how much the preliminary reaction has proceeded, liquid chromatography or a refractometer can be used.

When using the sulfur, the amount thereof to be added is usually 0.01 to 40% by mass, preferably 0.1 to 30% by mass, and more preferably 0.5 to 25% by mass in the composition for optical materials. When the amount is more than 40% by mass, the sulfur is not completely reacted, resulting in precipitation of the solid.

For the production of the optical material of the present invention, a curing catalyst, a modifier, an antioxidant, a blueing agent, an ultraviolet absorber, various performancemodifying additives, etc. can be further added to the composition for optical materials of the present invention according to need.

Examples of the curing catalyst include amines, phosphines, quaternary ammonium salts, quaternary phosphonium salts, tertiary sulfonium salts, secondary iodonium salts, mineral acids, Lewis acids, organic acids, silicic acids, tetrafluoroborates, peroxides, azo-based compounds, a condensation product of aldehyde with an ammonia-based compound, guanidines, thioureas, thiazoles, sulfenamides, thiurams, dithiocarbamates, xanthogenates and acidic phosphoric acid esters. Preferred are amines, phosphines, quaternary ammonium salts and quaternary phosphonium salts, and more preferred are quaternary ammonium salts and quaternary phosphonium salts.

The adding amount of the curing catalyst to be used in the present invention is 0.0001 to 10.0 parts by mass, and preferably 0.0005 to 5.0 parts by mass relative to 100 parts by mass of the composition for optical materials before the addition of the curing catalyst. When the amount of the polymerization catalyst to be added is more than 10 parts by mass, the refractive index and heat resistance of a cured product may be reduced and coloring may occur. When the amount is less than 0.001 parts by mass, curing may be performed insufficiently and heat resistance may be insufficient.

As the modifier, epoxy compounds or isocyanates can be added for the purpose of the improvement of various performances such as oxidation resistance, weather resistance, dyeability, strength and refractive index of the composition for optical materials. The adding amount of the modifier to be used in the present invention is determined within a range in which optical physical properties and mechanical physical properties are not impaired and cannot be determined unambiguously because of the chemical structure thereof, etc., but it is preferably 10 parts by mass or less relative to 100 parts by mass of the composition for optical materials before the addition of the modifier.

Hereinafter, specific examples of the method for producing an optical material in the present invention will be described.

The episulfide compound (A), the polythiol compound (B) and the photochromic compound (C), and according to need, sulfur and additives such as the curing catalyst, the antioxidant, the blueing agent, the ultraviolet absorber and various performance modifiers are homogeneously mixed to prepare the composition for optical materials. After that, it is injected into a mold made of glass or metal, a polymerization and curing reaction is promoted by heating, and then the obtained product is released from the mold.

Note that it is also possible to preliminarily polymerize a part or all of components of the composition for optical materials at −100 to 160° C. over 0.1 to 480 hours prior to cast molding in the presence or absence of a catalyst for preliminary reaction with or without stirring to subsequently prepare the composition for optical materials, followed by cast molding.

Particularly when a solid content is contained in compounds in the composition for optical materials and this causes difficulty in handling, this preliminary polymerization is effective. Conditions for the preliminary polymerization are preferably −10 to 120° C. and 0.1 to 240 hours, and more preferably 0 to 100° C. and 0.1 to 120 hours.

EXAMPLES

Hereinafter, the present invention will be specifically described by way of examples. However, the present invention is not limited thereto. Note that evaluation was carried out in manners described below.

<Refractive index>: The e-line was measured at 20° C. using a refractometer KPR-2000 manufactured by Shimadzu Corporation.

In the present invention, the refractive index is preferably 1.67 or higher, more preferably 1.68 or higher, and particularly preferably 1.69 or higher.

<Photochromic performance>: The absorbance at 380 to 780 nm was measured using an absorbance measurement apparatus UV-2450 manufactured by Shimadzu Corporation.

In the test, a resin flat plate having a thickness of 2 mm was irradiated with light at 365 nm using an UV irradiation apparatus SUPERCURE-204S manufactured by SAN-EI ELECTRIC CO., LTD., and irradiation was stopped when the absorbance reached the maximum value.

The time from when irradiation is started till when the absorbance reaches half the maximum value (R1), the visible transmittance obtained when the absorbance reaches the maximum value (T1), the transmittance at the maximum light absorption wavelength obtained when the absorbance reaches the maximum value (T2) and the time from when irradiation is stopped till when the absorbance reaches half the maximum value (R2) were evaluated.

R1 is an indication of the time required for color development, and R2 is an indication of the time required for decolorization. The shorter they are, the better the responsiveness is. In the present invention, R1 is preferably 40 seconds or less, more preferably 30 seconds or less, even more preferably 20 seconds or less, and particularly preferably 15 seconds or less. R2 is preferably 300 seconds or less, more preferably 200 seconds or less, and particularly preferably 100 seconds or less.

Further, the smaller T1 is, the better the photochromic efficiency is. In the present invention, T1 is preferably 30% or less, more preferably 25% or less, and particularly preferably 20% or less. T2 is preferably 50% or less, more preferably 40% or less, and particularly preferably 30% or less.

Example 1

To 100 parts by mass of a composition consisting of 85% by mass of bis(β-epithiopropyl)sulfide as the episulfide compound (A), 15% by mass of 1,10-dimercaptodecane as the polythiol compound (B) and 0.02% by mass of 4-[3-phenyl-3-(4-piperidin-1-yl-phenyl)-3H-benzo[f]chromen-6-yl]morpholine as the photochromic compound (C), 0.1 parts by mass of tetrabutylphosphonium bromide as the polymerization catalyst was added, and it was homogenously mixed at room temperature and then subjected to the deaeration treatment.

After that, it was filtered with a PTFE filter of 1 injected into a mold, and polymerized and cured with the temperature being elevated from 30° C. to 100° C. over 20 hours. After that, it was released from the mold and annealed at 100° C. for 1 hour, thereby obtaining a plate optical material having a thickness of 2 mm. Photochromic performance thereof is shown in Table 1.

Examples 2-5

The process was carried out in a manner similar to that in Example 1, except that the composition was as shown in Table 1, thereby obtaining an optical material. Photochromic performance (R1, R2, T1, T2) thereof is shown in Table 1.

Comparative Examples 1 and 2

The process was carried out in a manner similar to that in Example 1, except that the composition was as shown in Table 1, thereby obtaining an optical material. Photochromic performance (R1, R2, T1, T2) thereof is shown in Table 1.

Examples 6-28

A photochromic dye manufactured by Vivimed Labs was used as the photochromic compound, and the process was carried out in a manner similar to that in Example 1 using the composition shown in Table 2, thereby obtaining an optical material. Photochromic performance (R1, R2, T2) thereof is shown in Table 2.

Comparative Examples 3 and 4

The process was carried out in a manner similar to that in Examples 6-28, except that the composition was as shown in Table 2, thereby obtaining an optical material. Photochromic performance (R1, R2, T2) thereof is shown in Table 2.

TABLE 1

| | Episulfide compound (A) (% by mass) | Polythiol compound (B) (% by mass) | Photochromic compound (C) (% by mass) | Other components (% by mass) | Refractive index | R1 (sec) | T1 (visible transmittance) (%) | T2 (transmittance at maximum light absorption wavelength) (%) | R2 (sec) |
|---|---|---|---|---|---|---|---|---|---|
| Example 1 | A-1 (85) | B-1 (15) | C-1 (0.02) | Not used | 1.683 | 7 | 23 | 19 | 55 |
| Example 2 | A-1 (79) | B-1 (15) | C-1 (0.11) | Sulfur (6) | 1.691 | 15 | 20 | 17 | 33 |
| Example 3 | A-1 (85) | B-2 (15) | C-1 (0.02) | Not used | 1.686 | 10 | 20 | 17 | 64 |
| Example 4 | A-1 (85) | B-3 (15) | C-1 (0.02) | Not used | 1.689 | 15 | 22 | 18 | 82 |
| Example 5 | A-2 (85) | B-1 (15) | C-1 (0.02) | Not used | 1.683 | 12 | 12 | 10 | 57 |
| Comparative Example 1 | A-1 (100) | Not used | C-1 (0.02) | Not used | 1.707 | | Photochromic function did not work | | |
| Comparative Example 2 | A-1 (94) | Not used | C-1 (0.02) | Sulfur (6) | 1.715 | | Photochromic function did not work | | |

A-1: bis(β-epithiopropyl)sulfide
A-2: 2,5-bis(β-epithiopropylthioethylthiomethyl)-1,4-dithiane
B-1: 1,10-dimercaptodecane (carbon number of main chain: 10)
B-2: 1,8-dimercaptooctane (carbon number of main chain: 8)
B-3: 1,6-dimercaptohexane (carbon number of main chain: 6)
C-1: 4-[3-phenyl-3-(4-piperidin-1-yl-phenyl)-3H-benzo[f]chromen-6-yl]morpholine

TABLE 2

| | Episulfide compound (A) (% by mass) | Polythiol compound (B) (% by mass) | Photochromic compound (C) (% by mass) | Other components (% by mass) | Refractive index | R1 (sec) | T2 (transmittance at maximum light absorption wavelength) (%) | R2 (sec) |
|---|---|---|---|---|---|---|---|---|
| Example 6 | A-1 (85) | B-5 (15) | C-2 (0.08) | Not used | 1.698 | 15 | 50 | >300 |
| Example 7 | A-1 (80) | B-5 (20) | C-2 (0.08) | Not used | 1.700 | 28 | 6 | 171 |
| Example 8 | A-1 (75) | B-5 (25) | C-2 (0.08) | Not used | 1.701 | 8 | 8 | 19 |
| Example 9 | A-1 (75) | B-6 (25) | C-2 (0.08) | Not used | 1.670 | 32 | 50 | >300 |
| Example 10 | A-1 (70) | B-6 (30) | C-2 (0.08) | Not used | 1.666 | 31 | 40 | >300 |
| Example 11 | A-1 (60) | B-6 (40) | C-2 (0.08) | Not used | 1.656 | 8 | 5 | 54 |
| Example 12 | A-1 (90) | B-1 (10) | C-2 (0.08) | Not used | 1.686 | 26 | 4 | 248 |
| Example 13 | A-1 (85) | B-1 (15) | C-2 (0.08) | Not used | 1.683 | 12 | 2 | 77 |
| Example 14 | A-1 (80) | B-1 (20) | C-2 (0.08) | Not used | 1.678 | 10 | 2 | 56 |
| Example 15 | A-1 (75) | B-1 (25) | C-2 (0.08) | Not used | 1.674 | 8 | 2 | 46 |
| Example 16 | A-1 (70) | B-1 (30) | C-2 (0.08) | Not used | 1.671 | 8 | 2 | 43 |
| Example 17 | A-1 (85) | B-1 (15) | C-2 (0.02) | Not used | 1.683 | 10 | 5 | 70 |
| Example 18 | A-1 (85) | B-1 (15) | C-3 (0.08) | Not used | 1.683 | 19 | 1 | 90 |
| Example 19 | A-1 (85) | B-1 (15) | C-4 (0.08) | Not used | 1.683 | 12 | 13 | 20 |
| Example 20 | A-1 (85) | B-2 (15) | C-2 (0.08) | Not used | 1.686 | 14 | 3 | 105 |
| Example 21 | A-1 (85) | B-3 (15) | C-2 (0.08) | Not used | 1.690 | 17 | 3 | 136 |

TABLE 2-continued

|  | Episulfide compound (A) (% by mass) | Polythiol compound (B) (% by mass) | Photochronic compound (C) (% by mass) | Other components (% by mass) | Refractive index | R1 (sec) | T2 (transmittance at maximum light absorption wavelength) (%) | R2 (sec) |
|---|---|---|---|---|---|---|---|---|
| Example 22 | A-1 (85) | B-4 (15) | C-2 (0.08) | Not used | 1.693 | 22 | 6 | 149 |
| Example 23 | A-1 (85) | B-7 (15) | C-2 (0.08) | Not used | 1.684 | 38 | 25 | >300 |
| Example 24 | A-1 (85) | B-8 (15) | C-2 (0.08) | Not used | 1.695 | 15 | 50 | >300 |
| Example 25 | A-1 (79) | B-1 (15) | C-2 (0.08) | Sulfur (6) | 1.691 | 13 | 10 | 82 |
| Example 26 | A-1 (81) | B-1 (15) | C-2 (0.08) | Sulfur (4) | 1.686 | 11 | 5 | 66 |
| Example 27 | A-1 (83) | B-1 (15) | C-2 (0.08) | Sulfur (2) | 1.680 | 9 | 4 | 52 |
| Example 28 | A-1 (79) | B-1 (15) | C-2 (0.08) | Sulfur (6) | 1.691 | 13 | 20 | 33 |
| Comparative Example 3 | A-1 (100) | Not used | C-2 (0.08) | Not used | 1.707 | Photochronic function did not work | | |
| Comparative Example 4 | A-1 (94) | Not used | C-2 (0.08) | Sulfur (6) | 1.715 | Photochronic function did not work | | |

A-1: bis(β-epithiopropyl)sulfide
B-1: 1,10-dimercaptodecane (carbon number of main chain: 10)
B-2: 1,8-dimercaptooctane (carbon number of main chain: 8)
B-3: 1,6-dimercaptohexane (carbon number of main chain: 6)
B-4: 1,5-dimercaptopentane (carbon number of main chain: 5)
B-5: 3-thia-1,5-dimercaptopentane (carbon number of main chain: 4)
B-6: pentaerythritol tetrakis(3-mercaptopropionate) (carbon number of main chain: 9)
B-7: 3,6-dioxa-1,8-dimercaptooctane (carbon number of main chain: 6)
B-8: 3,7-dithia-1,9-dimercaptononane (carbon numer of main chain: 7)
C-1: 4-[3-phenyl-3-(4-piperidin-1-yl-phenyl)-3H-benzo[f]chromen-6-yl]morpholine
C-2: photochromic dye "Mulberry" manufactured by Vivimed Labs
C-3: photochromic dye "Flame" manufactured by Vivimed Labs
C-4: Photochromic dye "Rush" manufactured by Vivimed Labs

B-5

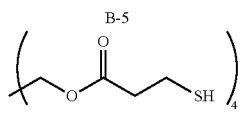

B-6

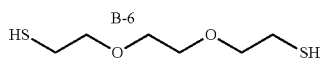

B-7

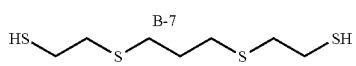

B-8

The invention claimed is:

1. A composition for optical materials, consisting of:
   an episulfide compound (A) in an amount of 65 to 90 parts by mass with respect to 100 parts by mass of the composition,
   a polythiol compound (B) in an amount of 10 to 35 parts by mass with respect to 100 parts by mass of the composition,
   a photochromic compound (C) in an amount of 0.01 to 0.5 parts by mass with respect to 100 parts by mass of the composition, and
   sulfur as an optional component, an optional polymerization catalyst and an optional curing catalyst;
   wherein the photochromic compound (C) is selected from the group consisting of a spiropyran compound, a spirooxazine compound, a spiroperimidine compound, a benzopyran compound, a fulgide compound, a naphthopyran compound, a diarylethene compound, and an azobenzene compound.

2. The composition for optical materials according to claim 1, wherein the episulfide compound (A) is a compound represented by formula (1):

(1)

wherein:
   m represents an integer of 0 to 4; and
   n represents an integer of 0 to 2.

3. The composition for optical materials according to claim 1, wherein the polythiol compound (B) is a compound represented by formula (5):

HS—X—SH (5)

wherein:
   X represents an alkylene group having at least one selected from the group consisting of —S—, —O— and —CO— in the main chain, wherein the carbon number of the main chain is 4 to 20; and X may have SH, a $C_{1-10}$ alkyl group, a $C_{1-10}$ alkylthiol group or a $C_{1-10}$ mercaptoalkylcarbonyloxy group in the side chain.

4. The composition for optical materials according to claim 1, wherein the polythiol compound (B) is a compound represented by formula (6):

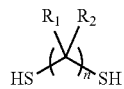
(6)

wherein:

n represents an integer of 4 to 20; and $R_1$ and $R_2$ may be the same or different and represent H, SH, a $C_{1-10}$ alkyl group or a $C_{1-10}$ alkylthiol group.

5. The composition for optical materials according to claim 4, wherein the polythiol compound (B) is a compound represented by formula (7):

(7)

wherein n represents an integer of 4 to 20.

6. The composition for optical materials according to claim 5, wherein n in formula (7) represents an integer of 5 to 20.

7. An optical material obtained by polymerizing and curing the composition for optical materials according to claim 1.

8. The optical material according to claim 7, having a refractive index from 1.670 to 1.701.

* * * * *